Dec. 26, 1967  D. L. COOK  3,360,189
BLEED ARRANGEMENT FOR GAS TURBINE ENGINES
Filed Oct. 11, 1965  3 Sheets-Sheet 1

INVENTOR
David L. COOK

ATTORNEY

Dec. 26, 1967  D. L. COOK  3,360,189
BLEED ARRANGEMENT FOR GAS TURBINE ENGINES
Filed Oct. 11, 1965  3 Sheets-Sheet 2
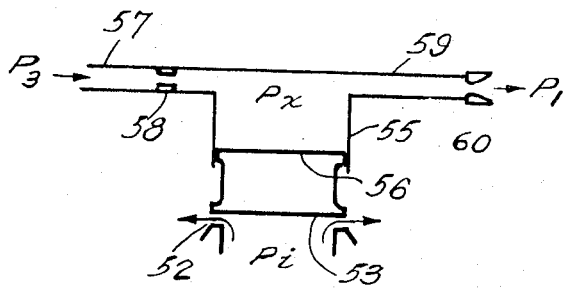
FIG.3
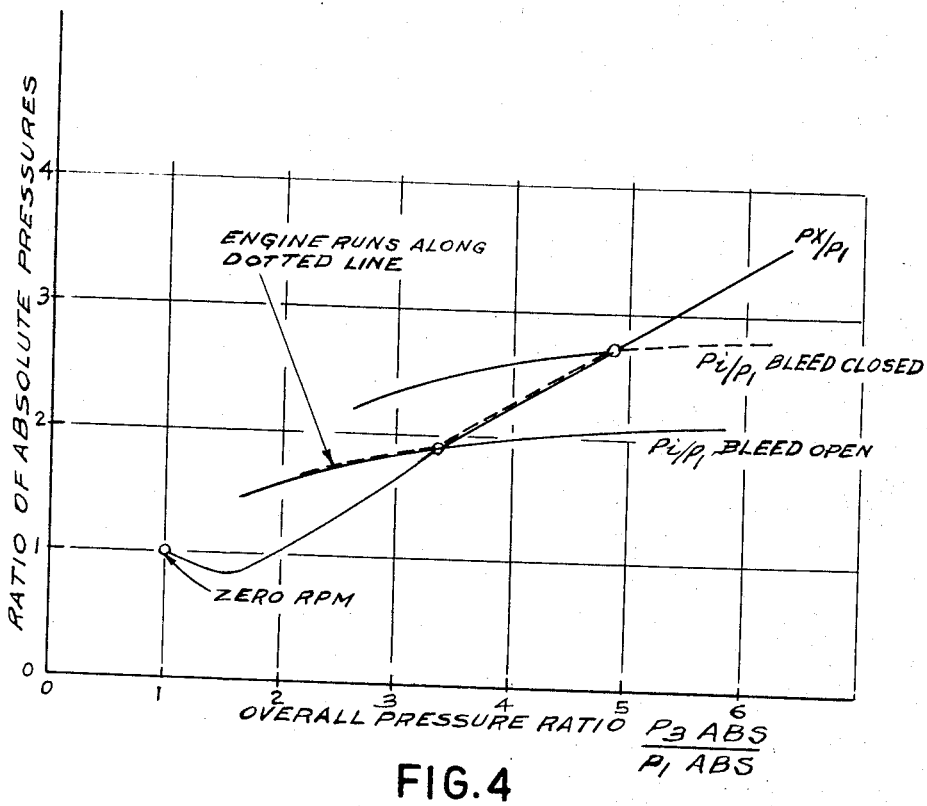
FIG.4
INVENTOR
David L. COOK
ATTORNEY Dec. 26, 1967  D. L. COOK  3,360,189
BLEED ARRANGEMENT FOR GAS TURBINE ENGINES
Filed Oct. 11, 1965  3 Sheets-Sheet 3
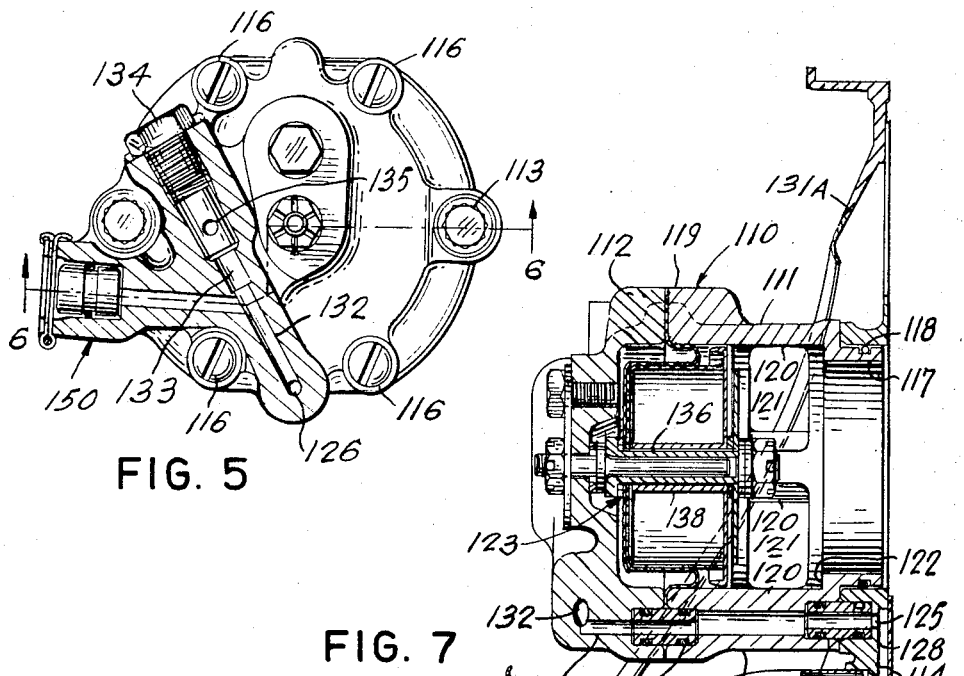
FIG. 5
FIG. 7
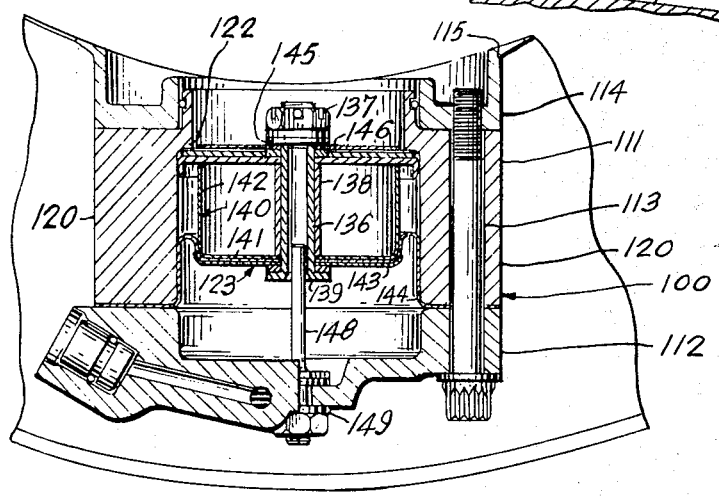
FIG. 6
INVENTOR
David L. COOK
ATTORNEY

United States Patent Office 3,360,189
Patented Dec. 26, 1967

3,360,189
BLEED ARRANGEMENT FOR GAS TURBINE ENGINES
David L. Cook, St. Lambert, Quebec, Canada, assignor to United Aircraft of Canada Limited, Longueuil, Quebec, Canada
Filed Oct. 11, 1965, Ser. No. 494,816
12 Claims. (Cl. 230—115)

ABSTRACT OF THE DISCLOSURE

A piston moving in a cylinder in response to a pressure differential between an intermediate compressor stage and the impeller outlet stage. Bleed portions, for allowing air from the compressor stage to escape, are provided in the cylinder wall, the effective area of which is determined by the position of the piston in the cylinder.

---

This invention relates to a bleed arrangement for gas turbine engines.

In the gas turbine art, it is common practice to improve the surge characteristics of the gas turbine's compressor, which may have two or more axial or radial flow compressor stages, by bleeding-off a portion of the compressor air after it has passed through the early compressor stages. The bleed-off air is vented to atmosphere or is returned to the compressor inlet. The valve through which bleed-off occurs is normally open at low rotational speeds of the engine and closes automatically as the rotational speed of the engine increases. The automatic control of the bleed valve can be effected by means of an engine speed signal generated at a suitable location in the engine or by means of pressure ratio measuring devices operating through suitable servo-actuators.

The present invention seeks to provide a bleed arrangement having the function described above which, however, is far more simple in construction and operation than hitherto proposed devices.

In accordance with the invention two forces, derived from the air pressures existing at a high pressure zone and at a lower pressure zone of the compressor, are applied to first and second faces of piston means whereby these forces are placed in direct opposition to one another. Thus the position of the piston means is directly dependent on the magnitudes of these forces, and movements of the piston are employed, by increasing or decreasing the effective area of discharge port means, to increase or decrease the rate at which air is bled from the compressor.

To prevent unduly early closure of the discharge port means a flow restricting orifice and a convergent-divergent nozzle are provided in series. The orifice is provided between the high pressure zone and said first face, and the nozzle is provided between said first face and an outlet through which air flowing from said first zone is passed. The provision of the orifice and nozzle results in the pressure being depressed in the region between these components during operation of the engine at extremely low rotational speeds, and it is to this region that said first face is connected.

Figure 1:
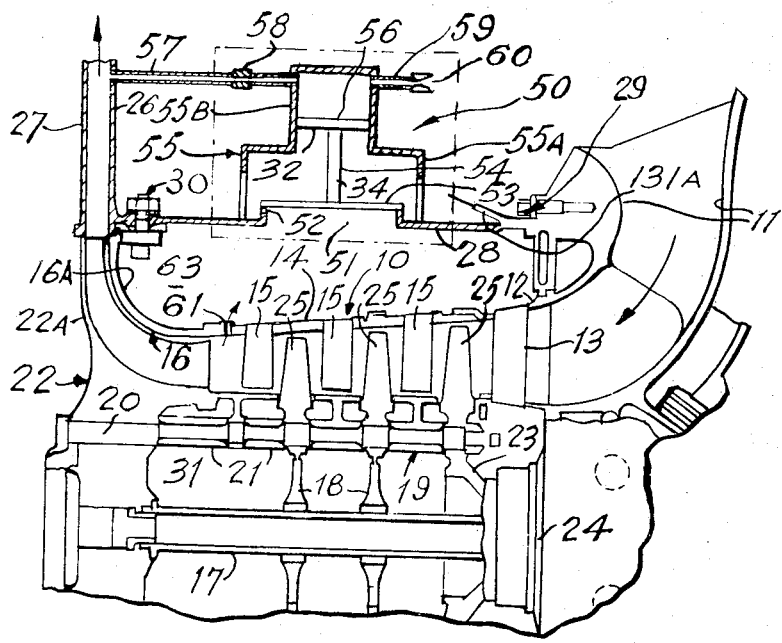
Figure 2:
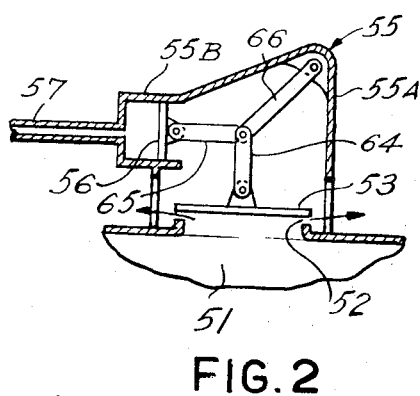

For a better understanding of the invention and to show how the same may be carried into effect reference will now be made, by way of example, to the accompanying drawings in which:

FIGURE 1 is a cross-section of the compressor assembly of a gas turbine engine and illustrates, in a diagrammatic manner, an embodiment of the bleed arrangement of the present invention, FIGURE 2 is a diagrammatic cross-section illustrating a further embodiment of the bleed arrangement of the present invention, FIGURE 3 is a diagrammatic representation of the bleed arrangement of FIGURE 1 and illustrates the pressures existing in the bleed arrangement, FIGURE 4 is a graph illustrating the operating characteristics of an engine having one of the bleed arrangements illustrated in FIGURE 1, FIGURE 5 is an end elevation, partly in vertical section, of an embodiment of the bleed arrangement of the invention, FIGURE 6 is a horizontal cross-section of the arrangement of FIGURE 5, and FIGURE 7 is a vertical cross-section of the arrangement of FIGURE 5.

The compressor assembly illustrated in FIGURE 1 includes an impeller housing generally indicated at 10 composed of an air inlet casing 11, an air inlet shroud 12 carrying guide vanes 13, a multi-part shroud assembly 14 carrying stator vanes 15 and a centrifugal impeller housing 16. The compressor assembly further includes a main shaft 17 carrying two compressor discs 18 spaced apart by a construction generally indicated at 19 and including tie-rods 20 and spacers 21. The tie-rods 20 pass through the discs 18 and also pass through a centrifugal impeller 22 mounted on the shaft 17 and located within the housing 16, and through a rear hub assembly generally indicated at 23. The hub assembly 23, which is mounted in a bearing generally indicated at 24, carries a series of compressor blades 25. Further series of compressor blades 25 are carried by each of the discs 18. Thus the compressor assembly described has three axial compressor stages, constituted by the three sets of blades 25 and the stator blades co-operating therewith, followed by a centrifugal compressor stage 22. Compressed air flows from the centrifugal compressor 22 through a duct defined between the spaced-apart disc-like parts 16A and 22A of the housing 16 and the impeller 22. The outer circular peripheries of the parts 16A and 22A abut the inner peripheries of further casing parts 26 and 27 which curve over to extend axially of the engine and leads to the combustion stage of the engine. The combustion stage is not illustrated.

The compressor assembly also includes a gas generator case 28 which extends between the compressor air inlet casing 11 and the impeller housing 16. Joints generally indicated at 29 and 30 are provided between the casing 11 and the case 28 and between the housing 16 and the case 28.

An air bleed arrangement, generally indicated at 50 is mounted on the case 28. At the location of the arrangement 50 the case 28 has a port 51 therein and the margins of the case 28 bounding this port are turned upwardly to form a valve seat 52. A piston 53 co-operates with the seat 52, the piston 53 being mounted at the lower end of a piston rod 54 and working within a chamber constituted by the lower, larger diameter part 55A of a cylinder 55. The piston 53 is a loose fit in the cylinder part 55A and the walling of the cylinder part 55A is provided with a number of large area apertures.

The upper part 55B of the cylinder 55 receives a power piston 56 which is mounted at the upper end of the rod 54. The piston 56 is a sliding fit in the cylinder part 55B whereby the part of the cylinder above the piston 56 is sealed from the part of the cylinder 55 below the piston 56.

A suitable duct 57 of fairly small bore leads through the casing part 26 and places the compressed air outlet duct, constituted between the parts 26 and 27, in communication with the upper end of the cylinder part 55B. A pressure reducing orifice 58 is provided in the duct 37.

An outlet from the upper end of the cylinder part 55B is provided, this outlet taking the form of a duct 59 of small bore having a back-pressure forming orifice or nozzle 60 located between the cylinder 55 and atmosphere.

The shroud assembly 14 is provided with a circumferentially extending series of slots 61 in the section thereof which is between the last compressor stage and the centrifugal impeller stage. The slots 61 permit air to flow from an intermediate stage of the compressor into a chamber, referenced 63, and defined between the case 28 and the housing 10. The pressure of the air which enters the chamber 63 is effective on the underside of the piston 53.

In the modified construction illustrated in FIGURE 2 parts common to FIGURES 1 and 2 constructions have been designated with the same references as used in FIGURE 1. Thus this modified construction includes a piston 53 within a cylinder part 55B and co-operating with a valve seat 52 formed by the upturned rim around the port 51, a power piston 56 operating in a cylinder part 55B, and a duct 57 leading to the compressed air outlet constituted between the parts 26 and 27. The construction of FIGURE 2 differs from that of FIGURE 1 in that the simple piston rod 54 of the FIGURE 1 construction is replaced by a mechanical linkage constituted by three arms 64, 65 and 66 each having one end pivoted to the other two arms. This linkage transmits movements of the piston 56 to the piston 53. The arm 64 has its other end pivotally secured to the piston 53, the arm 65 has its other arm pivotally connected to the piston 56 and the arm 66 slopes upwardly from its pivotal connection with the arms 64 and 65 to a pivotal mounting on the cylinder 55.

The mechanical linkage constituted by the arms 64, 65 and 66 is constructed to give a suitable variation in mechanical advantage as a function of the degree of opening of the piston 53.

Referring now to FIGURE 3 the ducts 57 and 59, the orifices 58 and 60, the pistons 53 and 56 and the valve seat 52 are all diagrammatically illustrated in that figure. The pressure existing in the duct 57 has been designated $P_3$, the pressure existing on the downstream side of the orifice 60 has been designated $P_1$, the pressure existing within the upper part of the cylinder 55 has been designated $P_x$ and the pressure existing within the chamber 63 has been designated $P_i$.

In use of the compressor, the bleed valve constituted by the piston 53 and the seat 52 is open while the engine is operating at low rotational speeds. In other words, the pressure existing in the chamber 63 due to the bleed-off of air through the slots 61 is sufficient to overcome the force exerted by the air at pressure $P_x$ existing within the upper part of the cylinder 55. Thus the piston 53 is raised from the seat 52 and air escapes freely to atmosphere through the ports in the piston 55. Obviously, the pressure $P_x$ is a function of the pressure $P_3$ and of the configuration and size of the orifices 58 and 60. As the speed of rotation of the engine increases, the pressure $P_3$ rises and consequently the pressure $P_x$ follows the generally upwardly trend of the pressure $P_3$. A pressure imbalance thus occurs between the pressure $P_x$ and $P_i$ and the piston 53 begins to descend toward the seat 52 thereby progressively closing the bleed-off valve constituted by the piston 53 and seat 52. At a predetermined rotational speed the valve closes completely so that no air is bled from the inter-compressor stage and all the air flowing through the intake casing 11 is delivered through the compressor outlet.

A typical operating characteristic of an engine equipped with the bleed-off arrangement shown in FIGURE 1 is plotted in FIGURE 4, and from this it will be seen that $P_x$ is depressed at low operating speeds. This depression is a direct result of the provision of the orifice 58 and the nozzle 60, and the effect of this depression is to prevent unduly early movement of the piston towards its closed position.

Referring now to FIGURES 5 through 7 the bleed arrangement illustrated therein consists of a housing 110 composed of a main housing part 111 and a cap 112. Bolts 113 (FIGURES 5 and 6) serve to secure the cap 112 to the main housing part 111 and in addition bolt the entire housing 110 to a ring 114 forming part of the gas generator case 115. As will clearly be seen from FIGURE 5 two bolts 113 are provided and in addition four screws 116 are provided to assist the bolts 113 in securing the cap 112 to the main housing part 111.

The main housing part 111 is composed of a first cylindrical section 117 which is entered in and is coaxial with the ring 114, there being a sealing ring 118 between the section 117 and the ring 114. The main housing part 111 further includes a ring-like portion 119 adjacent the cap 112 and four ribs 120 which join the ring-like portion 119 to the section 117. Three of the ribs 120 are of fairly large cross-sectional area and it is through two of these ribs that the bolts 113 are passed. The third rib of fairly large cross-sectional area is bored to constitute a gas flow conduit as will be described and the fourth rib (at the top of FIGURE 7) is of fairly small cross-sectional area. Between the ribs 120 the main housing part 111 has a series of four apertures or windows 121 (FIGURE 7). It will be noted that the internal diameter of the part of the main housing part 111 defined by the ribs 120 is larger than that of the section 117 whereby an annular seat 122 is formed at the junction between the ribs 120 and the section 117. As will be described hereinafter, this seat co-operates with the piston generally indicated at 123.

As will be seen from FIGURE 7, the lowermost rib 120 in that figure has a bore 124 therein, this bore being continued through the ring 114 by means of a bore 125 and through the cap 112 by means of a bore 126. Connectors 127 are provided between the cap 112 and the part 111, and between the part 111 and the ring 114 to prevent escape of gas at the joints between these components. The bore 125 leads to a recess 128 provided in the ring 114, this recess being covered by a plate 129 which prevents gases from the interior of the gas generator case 115 from entering the recess 128. A conduit 130 leads from the recess 128 through the ring 114 to a duct 131 which is the high pressure outlet of the compressor stage of the engine. Thus high pressure gas can be conducted through the conduit 130, the recess 128, the bores 125, 124 and 126 to a further bore 132 in the cap 112.

The bore 132 extends across the cap 112 and has in the flow path thereof a jet 133, that is to say a flow restricting orifice equivalent to the orifice 58 of FIGURE 1, and a convergent-divergent orifice 134 equivalent to the orifice 60 of FIGURE 1. To permit ready adjustment of the operating characteristics of the bleed arrangement, both the jet 133 and the convergent-divergent nozzle 134 are removably mounted in the bore 132. Thus the nozzle 134 is formed in a bore in a threaded "bolt" which is screwed into the bore 132 and the jet 133 is a press fit in the bore 132. The nozzle 134 is open to the ambient medium. A port 135 leads from between the nozzle 134 and the jet 133 to the interior of the cylinder defined by the housing 110.

The piston 123 is composed of a central tube 136 one end of which is threaded to receive a lock nut 137. A spacer 138 surrounds the tubet 136 and the end of the tube 136 remote from the nut 137 is turned outwardly to form an annular rim 139. A further component 140 of the piston 123 has an annular portion 141 thereof clamped between the spacer 138 and the rim 139 and a cylindrical portion 142 thereof extending parallel with the tube 136 towards the nut 137.

Clamped between the portion 141 and an annular retainer 143 is a diaphragm 144 of the rolling or "Bellofram" type. As will clearly be seen from FIGURES 6 and 7 the diaphragm 144 is annular in form with its inner periphery clamped between the portion 141 and the retainer 143 and its outer periphery clamped by the bolts 113 and the screws 116 between the main housing part 111 and the cap 112. The radius of the diaphragm 144 is considerably more than the radius of the housing 110 and the excess lies in the annular gap between the portion 142 and the inner surfaces of the rib 120.

The nut 137 also serves to clamp, between washers 145 and the adjacent end of the spacer 138, a two-part sealing arrangement 146 and a disc 147 which forms part of the mechanical structure of the piston. The disc 147 acts as a backing for the non-rigid sealing arrangement 147, which as will be seen from FIGURE 6, is pressed in one position of the piston 123 against the seat 122.

Motion of the piston 123 is guided by means of a pin 148 which projects inwardly from the cap 12 and is fastened thereto by an arrangement generally indicated at 149. The pin 148 enters the bore of the tube 136.

In operation of the device the piston is subjected to air pressures on opposed faces thereof. The face of the piston constituted by the sealing arrangement 146 is subjected to the pressure existing at the intermediate stage of the compressor, that is, the pressure within the part of the gas generator case to which the housing 111 is secured. Thus the section 117 effectively defines an inlet port placing the interior of the gas generator case in communication with one face of the piston 123.

Gas at a higher pressure than that existing at the port constituted by the section 117 flows from the duct 131 through the conduit 130, the recess 128, the bores 125, 124 and 126 and into the bore 132. The gas then flows through the jet 133 and the nozzle 134 before being discharged. Thus a pressure is established at the port 135 which depends on the pressure existing in the duct 131 and on the size and configuration of the jet and nozzle 133 and 134. The pressure at the port 135 is applied to the chamber defined between the cap 112 and the diaphragm 144. Thus two opposing pressures act on the piston 123.

During operation of the engine at low rotational speeds the force exerted on the piston 123 by gas flowing through the section 117 is greater than the force exerted on the other side of the piston 123 by gas entering the piston chamber through the port 135. Thus bleed-off of air from the intermediate compressor stage occurs, this air flowing past the seat 122 and to the ambient medium through the windows 121 between the ribs 120. As the rate of rotation of the engine increases the pressure in the duct 131 increases more rapidly than does the pressure of the air in the intermediate stage. Consequently, the force exerted on the left hand face of the piston 123, as viewed in FIGURE 7, begins to exceed that exerted on the right hand face and a progressive closing movement occurs. As the piston moves to the right in FIGURE 7 the free areas of the windows 121 decrease so that the air flow therethrough is progressively throttled. Eventually, the sealing arrangement 146 encounters the unapertured ring of material 122A adjacent the seat 122 and then encounters the seat itself whereupon the flow of air through the windows 121 ceases completely.

The bleed arrangement remains closed until a decrease in the rotational speed of the engine occurs and the pressure exerted on the right hand face of the piston once again exceeds that exerted on the left hand face of the piston.

In some engine installations it is not convenient to provide the conduit 130 connected to the duct 131 and in this case the socket generally indicated at 150 is connected, in any suitable manner, to the duct 131 or an equivalent part of the structure of the engine.

By way of example the convergent-divergent nozzle 134 may have a diameter 0.076/0.075" and the jet 133 can have a diameter of 0.056/0.0564. The exact dimensions of these components depends, of course, on the desired operating characteristics of the bleed arrangement.

The element 131A in FIGURE 7 is a conical member which connects the diffuser structure to the engine intake casing. A part of this element is also shown in FIGURE 1.

I claim:

1. An air bleed arrangement for an intermediate pressure stage of the compressor of a gas turbine engine, the arrangement including piston means having first and second faces, the piston being disposed in a cylinder, discharge port means for permitting bleed of air from said intermediate stage, the effective area of the discharge port means through which bleed occurs being dependent on the position of said piston means and being progressively increased from zero to maximum and vice-versa by forward and return motions respectively of said piston means, conduit means defining a first flow path for conveying air at high pressure from said compressor to an inlet in said cylinder in communication with the first face, a flow restricting orifice in said conduit, means defining a second flow path for conveying air at a lower pressure than said high pressure from the compressor to said second face of the piston whereby forces derived from the pressures of said high pressure and lower pressure air are opposed and utilized to determine the position of said piston means and hence the effective area of said port means, a further conduit, an outlet from said cylinder leading to said further conduit and through which the high pressure air is discharged from the cylinder, and a convergent-divergent nozzle in said conduit.

2. An air bleed arrangement according to claim 1 in which said discharge port means is in the form of a valve seat, and said piston means is adapted to contact said valve seat and close said discharge port means.

3. An air bleed arrangement for an intermediate stage of the compressor of a gas turbine engine, the arrangement including a piston having first and second faces, the piston means being disposed in said cylinder, discharge port means for permitting air to be discharged from said intermediate stage, the effective area of said port means through which discharge occurs being dependent on the position of said piston, and being progressively increased from zero to maximum and vice-versa by forward and return motions respectively of said piston, means defining a first flow path for conveying air from said intermediate stage to said first face of said piston and to said port means whereby the air exerting a pressure on said first face is the air bleed from the compressor, and means defining a second flow path for conveying air from a later stage of said compressor to said second face of the piston means, the second flow path including a flow restricting orifice between the later stage of the compressor and the cylinder and a convergent-divergent nozzle between said cylinder and an open discharge end of said second flow path, whereby the pressures at said intermediate and later stages of the compressor are opposed and utilized to control the effective area of said port means by controlling the position of said piston.

4. An air bleed arrangement according to claim 3 wherein said cylinder is connected to said second flow path by way of a port opening into the second flow path between said orifice and said nozzle.

5. An air bleed arrangement according to claim 3 wherein said second flow path includes a conduit connecting said later stage to the inlet of a cylinder in which said piston is disposed.

6. An air bleed arrangement for an intermediate pressure stage of the compressor of a gas turbine engine, the arrangement comprising a cylinder, first flow path defining means for placing one end of said cylinder in communication with said intermediate stage of said compressor whereby air is conveyed from said intermediate stage to said cylinder, second flow path defining means for placing the other end of said cylinder in communication with a higher pressure zone of said compressor, a flow restricting orifice between said zone and said cylinder, and a convergent-divergent nozzle between said cylinder and a discharge end of said second flow path, a piston in said cylinder between said one and other ends whereby opposed forces are exerted on the piston by the air conveyed to said cylinder through said first and second flow path defining means, an imbalance between said forces causing motion of the piston along the cylinder, port means in the walling of said cylinder adjacent said one end and through which is discharged air conveyed to said one end of the cylinder by the first flow path defining means, the effective area of said port means depending on the position of said piston in said cylinder, motion of the piston towards said one end progressively decreasing the effective area of said port means and eventually closing the port means and motion of the piston in the other direction increasing the effective area of the port means.

7. An air bleed arrangement according to claim 6, wherein said cylinder is connected to said second flow path by means of a port opening into said second flow path between said orifice and said nozzle.

8. An air bleed arrangement according to claim 6, wherein a rolling diaphragm is secured to said piston and to said cylinder completely to seal said one end of the piston from the other end of the piston while permitting motion of the piston in the cylinder.

9. In an air bleed arrangement for permitting discharge of air from an intermediate pressure stage of the compressor of a gas turbine engine at which stage stalling occurs during operation at the engine in its lower speed range, the provision of
 (a) displaceable piston means having first and second faces,
 (b) first and second flow path defining means for conveying air to said first and second faces respectively from first and second zones of said compressor whereby opposed forces are applied to said piston means which forces are derived from the pressure existing at said zones, said first zone being at the high pressure outlet region of the compressor, and said second zone being at a lower pressure region of said compressor, a flow restricting orifice in said first flow path and a convergent-divergent nozzle between said orifice and a discharge end of said first flow path,
 (c) discharge port means of variable effective discharge area for permitting air bleed therethrough from said intermediate stage, said effective area being dependent on the position of said piston means whereby the relative magnitudes of said opposed forces control the rate of air bleed from said intermediate pressure stage.

10. In an air bleed arrangement according to claim 9, the provision of a cylinder and a piston displaceable within said cylinder, opposed ends of said piston constituting said first and second faces, first and second inlets to said cylinder connected to said first and second flow path defining means respectively, and an air outlet from said cylinder, said outlet constituting said outlet port means and the effective area thereof through which air entering said cylinder through said first inlet is discharged being increased from zero to maximum and vice-versa by forward and return motion of said piston in the cylinder whereby a progressively increasing volume of air is discharged with decreasing engine speed.

11. In an air bleed arrangement according to claim 10, the feature that said first flow path is connected to said cylinder by a port opening into said first flow path between said orifice and said nozzle.

12. An air bleed arrangement for an intermediate pressure stage of the compressor of a gas turbine engine, the arrangement including:
 (a) side and top walls defining a chamber, piston means adapted to slide in said chamber;
 (b) the piston including a first and second face, wherein the first face defines a sealed chamber with the side and top walls;
 (c) a discharge port means for permitting bleed of air from said intermediate stage, the effective area of the discharge port means through which bleed occurs being dependent on the position of said piston means and being progressively increased from zero to maximum and vice-versa by forward and return motions respectively of said piston means;
 (d) means defining a first flow path for conveying air from the compressor outlet to the sealed portion of the chamber in contact with said first face;
 (e) means defining an outlet flow path from said sealed portion of the chamber;
 (f) restricting means in said outlet for restricting the flow therein and causing a pressure build up in said sealed portion of the chamber;
 (g) means defining a third flow path for conveying air from the compressor to said second face of the piston, whereby the relative pressure differential on one face of the piston, with respect to the other face, determines the relative position of the piston means with respect to the discharge port means.

References Cited
UNITED STATES PATENTS

| | | | |
|---|---|---|---|
| 2,732,125 | 1/1956 | Ruby | 230—115 |
| 2,874,926 | 2/1959 | Gaubatz | 230—115 |
| 3,006,145 | 10/1961 | Sobey | 230—114 |
| 3,022,040 | 2/1962 | Miller | 230—114 |
| 3,035,408 | 5/1962 | Silver | 230—114 |
| 3,079,121 | 2/1963 | Griffing | 230—114 |
| 3,107,892 | 10/1963 | Ellis | 230—114 |
| 3,298,600 | 1/1967 | Likaver | 230—114 |

HENRY F. RADUAZO, *Primary Examiner.*